US008924002B2

(12) United States Patent
Andersen et al.

(10) Patent No.: US 8,924,002 B2
(45) Date of Patent: Dec. 30, 2014

(54) ADAPTIVE REGISTRATION DURING PRECISION GRAPHICS CUTTING FROM MULTIPLE SHEETS

(75) Inventors: Geo Andersen, Aabyhoej (DK); Steen Mikkelsen, Fontana, WI (US)

(73) Assignee: i-cut, Inc., Lake Geneva, WI (US)

(*) Notice: Subject to any disclaimer, the term of this patent is extended or adjusted under 35 U.S.C. 154(b) by 862 days.

(21) Appl. No.: 13/092,554

(22) Filed: Apr. 22, 2011

(65) Prior Publication Data

US 2012/0266728 A1 Oct. 25, 2012

(51) Int. Cl.

*G06F 19/00* (2011.01)
*G05B 15/00* (2006.01)
*G05B 19/00* (2006.01)
*B26D 1/00* (2006.01)
*B41F 1/34* (2006.01)
*B26D 5/00* (2006.01)
*B26F 1/38* (2006.01)

(52) U.S. Cl.

CPC .............. *B26D 5/005* (2013.01); *B26F 1/3813* (2013.01); *B26D 5/007* (2013.01)
USPC ........... 700/125; 700/134; 700/167; 700/259; 83/13; 101/485

(58) Field of Classification Search

USPC ........ 700/125, 134, 167, 259; 83/13; 101/485
See application file for complete search history.

(56) References Cited

U.S. PATENT DOCUMENTS 5,355,157 A 10/1994 Yoshino
5,436,027 A 7/1995 Offer
6,619,167 B2 9/2003 Mikkelsen et al.
6,619,168 B2 9/2003 Alsten et al.
6,672,187 B2 1/2004 Alsten et al.
6,772,661 B1 8/2004 Mikkelsen et al.
6,934,041 B2 8/2005 Liston et al.
7,035,557 B2 4/2006 Boness et al.
7,040,204 B2 5/2006 Mikkelsen et al.
7,140,283 B2 11/2006 Alsten et al.
2005/0031191 A1* 2/2005 Venkatachalam ............. 382/152
2006/0196381 A1 9/2006 Mikkelsen et al.
2008/0316504 A1* 12/2008 Nemets et al. ................ 356/614
2010/0042361 A1* 2/2010 Hadley et al. ................. 702/152

* cited by examiner

*Primary Examiner* — Kavita Padmanabhan
*Assistant Examiner* — Jason Lin
(74) *Attorney, Agent, or Firm* — Jansson Munger McKinley & Shape Ltd.

(57) ABSTRACT

A method and programmed apparatus for cutting graphics from substantially-identical sheets with graphics and registration marks printed thereon using a plotter and controlled cutter and sensor movable over the sheets, including: (1) sensing work-surface positions of the marks of a sheet and calculating an expected work-surface position for each such mark based on the work-surface positions of other marks of the sheet; (2) classifying each mark as active or inactive based on a first error criterion and applying the classification to corresponding marks of a subsequent sheet, the active marks being fewer than the total number of printed marks; (3) sensing the work-surface positions of the active marks of the subsequent sheet; and (4) cutting the graphics from the subsequent sheet based on the sensed positions of the active marks, thereby reducing the time for accurate cut-processing of the subsequent sheet.

20 Claims, 5 Drawing Sheets

ADAPTIVE REGISTRATION DURING PRECISION GRAPHICS CUTTING FROM MULTIPLE SHEETS

FIELD OF THE INVENTION

This invention is related generally to the field of cutting of graphics areas or the like from sheets for various purposes, and other narrow-path processing about graphics areas on sheets and specifically to improving the speed and accuracy of such processing.

BACKGROUND OF THE INVENTION

The technical field involving the cutting of graphic areas from sheets, or otherwise doing narrow-path processing about graphics images on sheets, includes, for example, the face-cutting of laminate sheets to form decals. More specifically, a graphic-image area on the face layer of a laminate needs to be cut away from the remainder of the face layer so that the graphic area (e.g., a decal) can subsequently be pulled away from the backing layer of the laminate and be applied elsewhere as intended. Extremely accurate face-layer cutting about the graphics is obviously highly desirable.

This is but one example in which highly accurate sheet cutting is desirable. In many other situations, highly accurate sheet cutting may not involve face-cutting, but through-cutting, in which the full thickness of the sheet is cut about a graphics area on the sheet. And in many situations, rather than highly accurate cutting, highly accurate scoring, creasing, line-embossing or the like is desired, and in each case, of course, such processing is along a line the varying direction of which is determined by the shape of the graphics area. Together, cutting and these other types of operations on sheets having one or more graphics areas thereon are referred to herein for convenience as "narrow-path processing." For convenience, the prior art problems and the invention herein which solves such problems will be discussed primarily with reference to sheet-cutting methods and apparatus, but such discussion is not intended to limit the scope of the invention but merely to be exemplary.

Methods of cutting and associated apparatus which address many of the problems encountered in such processing of sheet material are part of the i-cut® vision cutting system from i-cut, Inc. (formerly Mikkelsen Graphic Engineering) of Lake Geneva, Wis., and are the subject of several patents, including for the U.S. Pat. Nos. 6,772,661, 6,619,167, 6,619,168, 6,672,187, 7,140,283 and 7,040,204. The invention described in U.S. Pat. No. 6,772,661 is a method and apparatus for achieving highly improved accuracy in cutting around graphics areas in order to fully compensate for all types of two-dimensional distortion in the sheets from which the graphics areas will be cut, including distortion of differing degrees in one dimension or along one direction on the sheet of material or distortion which varies non-uniformly across the sheet. The distortion may be from the printing process or from some other post-printing process such as material handling or during the cutting process itself. This invention also provides improved speed and accuracy in cutting or other narrow-path processing and greater efficiency of material usage.

The inventions described in U.S. Pat. Nos. 6,619,167, 6,619,168 and 6,672,187 relate to improvements in the cut-processing of sheets in flatbed plotters, including methods and apparatus to speed up processing and to automate the processing of multiple sheets. In particular, U.S. Pat. Nos. 6,619,168 and 6,672,187 include a search feature which enables the apparatus to search for the first two registration marks or other reference features (e.g., corners of the sheet, elements in a graphics area, or other objects for which a position can be unambiguously determined) if one or both of these registration marks or other reference features is not where it is expected to be on the work surface.

In some cases, such as in the i-cut® system, a flatbed plotter is used. These are devices having a position-controlled cutting implement above a flat work surface on which the sheet to be cut rests. The cutting implements are controlled with controller-supplied instructions and specific graphics data based on the X-Y coordinates necessary to achieve cutting along the intended path, such as about the perimeter of a graphics area.

Despite significant advances such as those in the i-cut® system, computer-controlled cutting and other processing of graphics sheets have not yet achieved the highest levels of efficiency and performance which potentially can be reached by such automated systems. Achieving greater speed, overall efficiencies and accurate performance in cutting or other forms of narrow-path processing are continuing challenges encountered with such systems. Increased efficiency of multiple-sheet processing would be achieved if the time to "read" a group of registration marks can be reduced while at the same time maintaining a desired level of accuracy. The present invention provides improvement in such processing by reducing the total time required to "read" (sense) registration marks.

OBJECTS OF THE INVENTION

It is an object of the present invention to provide an improved system for precision cutting or other narrow-path processing of graphics areas on sheets by addressing some of the problems and shortcomings of the prior art, including those referred to above.

Another object of the invention is to provide an improved system for precision cutting or other narrow-path processing of graphics areas on sheets which maintains accurate processing performance while reducing the total time for reading registration marks.

Another object of the invention is to provide an improved system for precision cutting or other narrow-path processing of graphics areas on sheets which enables a user to adjust the speed and accuracy of system operation.

Another object of the invention is to provide an improved system for precision cutting or other narrow-path processing of graphics areas on sheets which enables improvements in speed to be achieved during completely automated operation.

Still another object of the invention is to provide such a system which enables the user to trade off speed and accuracy in a single user setting.

Yet another object of the invention is to provide such a system which permits the user to pre-print a large number of registration marks at and about the graphics areas without such marks necessarily reducing processing time, while at the same time ensuring high processing accuracy with arbitrary sheet distortions.

And yet another object of the invention is to provide such a system the operation of which relieves the user of the task of determining where the best locations are for registration marks at and about the graphics areas to ensure accurate cutting.

How these and other objects are accomplished will become apparent from the following descriptions and the drawings.

SUMMARY OF THE INVENTION

The invention is an improved method and apparatus (for carrying out the method) for cutting graphics areas from a multiplicity of substantially-identical sheets having registration marks at predetermined positions at and about the graphics areas.

The inventive method includes (a) providing a plotter for sequentially receiving the sheets, (b) providing a sensor operatively connected to the plotter for moving over a work surface and configured to sense work-surface positions of registration marks on the sheets, (c) providing a cutter operatively connected to the sensor and movable to cut the graphics areas from a sheet in response to sensed registration-mark positions with respect to the work surface, and (d) providing a programmed controller operatively connecting the cutter to the sensor to control cutter movement. The improvement comprises: (1) sensing the work-surface positions of the registration marks of a sheet and calculating an expected work-surface position for each of such registration mark based on the work-surface positions of at least some of the other registration marks; (2) classifying each registration mark as active or inactive based on a first error criterion and applying the classification to corresponding marks of a subsequent sheet, the active marks being fewer than the total number of registration marks; (3) sensing the work-surface positions of the active registration marks of the subsequent sheet; and (4) cutting the graphics area(s) from the subsequent sheet based on the sensed positions of the active marks. The inventive method reduces the time for accurate cut-processing of the subsequent sheet.

The term "plotter" as used herein includes flatbed plotters in which a sheet to be processed is placed on a flat (two-dimensional) table surface. Such surface is referred to as the work surface or the sheet-receiving surface. The term "plotter" also includes apparatus having a cylindrical surface as its sheet-receiving and work surface. Such apparatus may process either roll-fed material or sheet material.

The term "registration marks" as used herein refers to printed marks at and about graphics areas. Registration marks may be pre-printed circles, filled or unfilled, of equal or unequal size. Registration marks may have a variety of different shapes and sizes, i.e., any shape and size which enables a sensor and controller to determine or read their locations (i.e., positions) on the work surface unambiguously. In circular form, registration marks typically may be about 3 to 12 mm in diameter. The color of registration marks is such as to create sufficient contrast to the background of a sheet containing graphics. The term "registration marks" includes holes through a sheet which can be sensed in the same way printed marks are sensed.

The sensor, cutter, and plotter are all operatively connected. "Operatively connected" as used herein does not imply merely direct connections between the two components said to be operatively connected (such connections may or may not be used), but means that there is functional connectivity such that information flows to and from the various components enabling these components to operate as described. In the present invention, the controller is configured to connect sensor, cutter and plotter as it controls the process being carried out within the inventive method.

Preferred embodiments of the inventive cutting method further include the steps of (i) calculating an expected work-surface position for an active registration mark of the subsequent sheet based on the work-surface positions of at least some of the active registration marks of the subsequent sheet, (ii) determining whether an active registration mark violates a second error criterion, and (iii) if a mark violates the second error criterion, determining whether the expected work-surface positions of any inactive registration marks are influenced by the violating mark and reclassifying the influenced inactive marks as active marks for a further subsequent sheet. Such preferred embodiments may also include repetitive steps of determining which registration marks are active for sheets to accurately and quickly cut-process the multiplicity of sheets.

In some preferred embodiments of the inventive cutting method, the first error criterion is a first threshold distance and the classifying includes (i) computing the distance between the expected and sensed work-surface positions of an active registration mark and (ii) comparing the computed distance for such mark with the first threshold distance. Such mark thereupon is classified as inactive if its computed distance is less than the first threshold distance.

In other preferred embodiments, the method further includes the step of adjusting the first error criterion threshold distance to select a desired accuracy and speed of cutting. In some of these embodiments, the second error criterion is a second threshold distance, and some embodiments include the step of adjusting the second error criterion threshold distance to select a desired accuracy and speed of cutting.

In highly-preferred embodiments of the inventive cutting method, the method further includes the step of randomly selecting one or more inactive registration marks and classifying them as active marks. The number of randomly-selected marks is a user-adjustable percentage of the inactive marks and the first threshold distance, the second threshold distance, and the user-adjustable percentage are simultaneously adjusted with a single user-setting.

The inventive method also applies to a method for narrow-path processing graphics areas on a multiplicity of substantially-identical sheets having registration marks at predetermined positions at and about the graphics areas in the same way as with cut-processing.

As mentioned above, the invention includes apparatus for carrying out the inventive method. The apparatus for cutting graphics areas from a multiplicity of substantially-identical sheets having registration marks at predetermined positions at and about the graphics areas includes (a) a plotter for sequentially receiving the sheets, (b) a sensor operatively connected to the plotter for moving over a work surface and configured to sense work-surface positions of registration marks of the sheets, (c) a cutter operatively connected to the sensor and movable to cut the graphics areas from a sheet in response to sensed registration-mark positions, and (d) a programmed controller operatively connecting the cutter to the sensor to control cutter movement. The apparatus is adapted to (a) sense the work-surface positions of the registration marks of a sheet and calculate an expected work-surface position for each such registration mark based on the work-surface positions of at least some of the other registration marks, (b) classify each registration mark as active or inactive based on a first error criterion and apply the classification to corresponding marks of a subsequent sheet, the active marks being fewer than the total number of registration marks, (c) sense the work-surface positions of the active registration marks of the subsequent sheet, and (d) cut the graphics area(s) from the subsequent sheet based on the sensed positions of the active marks. The inventive apparatus reduces the time for accurate cut-processing of the subsequent sheet.

DETAILED DESCRIPTION OF PREFERRED EMBODIMENTS

Figure 1:
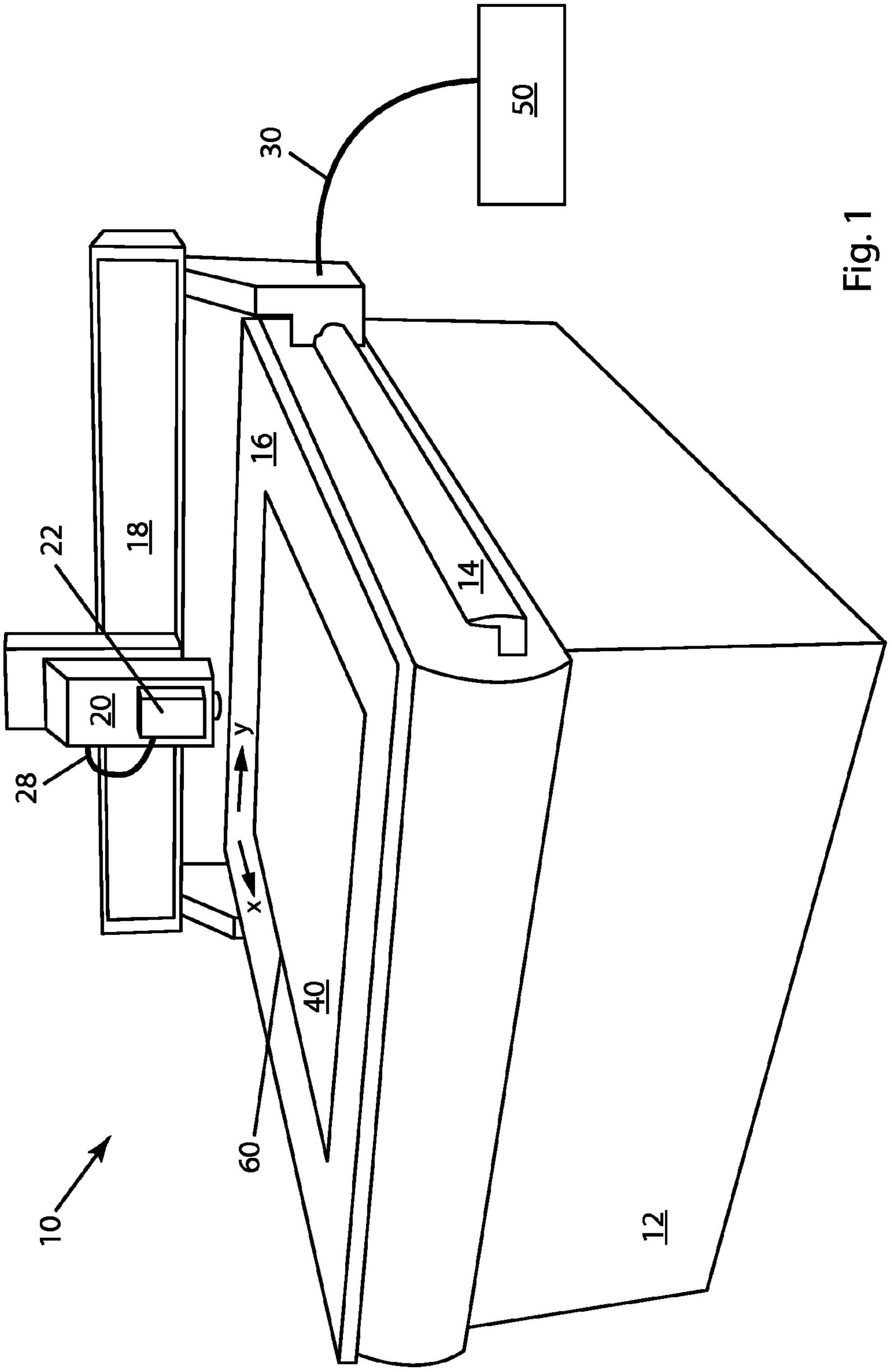
FIG. 1 is a perspective view of a controlled cutting apparatus on which embodiments of the present inventive method can be carried out.

Referring to FIG. 1, a perspective view of a cutting apparatus 10 is shown. Cutting apparatus 10 has a base 12 and a work or sheet-receiving surface 16. Cutting apparatus 10, which is shown with a sheet 40 positioned on work surface 16, is also known as a plotter, cutting table or cutter in the art, and may, for example, be a Kongsberg cutter from Esko Artwork of Gent, Belgium.

Cutting apparatus 10 includes two longitudinal guide rails 14 (one shown) mounted on the two sides of base 12 and a transverse member 18 suspended between longitudinal guide rails 14. Transverse member 18 is driven along guide rails 14 by a motor (not shown). A cutting tool 20, also driven by a motor (not shown), rides on transverse member 18. Cutting tool 20 has a cutting knife (not shown). Movement of cutting tool 20 over work surface is performed by transverse member 18 moving back and forth along guide rails 14 and cutting tool 20 moving back and forth along transverse member 18. Cutting tool 20 may have pressure- and tangential-controlled tungsten carbide blades or other blades that are generally known or lasers (all not shown). The cutter driver (not shown) which controls cutting tool 20 is standard and is known in the art.

A sensor 22 is shown attached to cutting tool 20, although it is not necessary for it to be attached cutting tool 20. Sensor 22 may be an optical detector, such as a CCD camera, which is known in the art, responsive to the registration marks 44 (see FIG. 2) and other reference features of sheet 40.

Cutting apparatus 10 also includes a controller 50. Controller 50 may include a programmed computer or other programmable device which contains instructions for controlling the movement of cutting tool 20 in response to data from sensor 22 and information provided to controller 50 describing the graphics areas 42*a*-42*d* (see FIG. 2) and registration marks 44 on sheet 40. Controller 50 may be physically contained in more than one component and/or location, e.g., with a portion of controller 50 located within base 12 and another portion in a separate unit as shown in FIG. 1.

Sensor 22 is connected to an input of controller 50 by cables 28 and 30. Controller 50 is also connected to and drives cutting tool 20. Controller 50 receives the inputted external data and compares it to the information which it has stored in it. For each graphics area 42*a*-42*d*, the information provided to controller 50 is the position of points along the cut paths (e.g., perimeter of the graphics area) relative to the positions of registration marks 44 as printed on sheet 40. Controller 50 may have the positions of registration marks 44 and the intended cutting path defined in X-Y coordinates.

Figure 2:
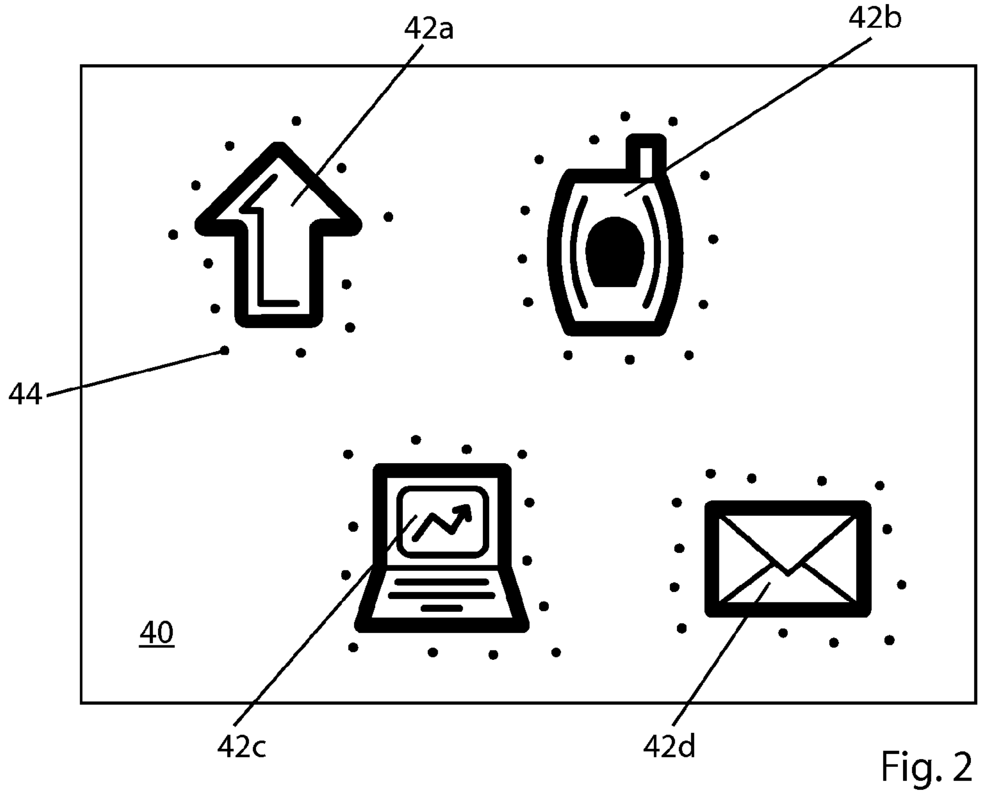
FIG. 2 is a top view of a sheet of material with pre-printed graphics areas and registration marks printed thereon at and about the graphics areas.

Referring to FIG. 2, registration marks 44 are pre-printed on sheet 40 at and about graphics areas 42*a*-42*d*. Sheet 40 has a multiplicity of registration marks 44 preprinted thereon, including several around each of the graphics areas 42*a*-42*d* which are intended to be cut from sheet 40. Registration marks 44 are adjacent to but not contiguous with the perimeters of preprinted graphics areas 42*a*-42*d*.

Controller 50 compares the actual distance between the three registration marks 44 which are closest to a point on the intended cutting path and adjusts the cutting path according to the changes between these registration marks 44 using the information of their positions on sheet 40 when the marks were printed. The cutting-path adjustments are made by making changes in the X-Y coordinates of points along the cutting path. In operation, sensor 22 is positioned over a registration mark 44. Sensor 22 and controller 50 find the mathematical center of a registration mark 44, and the X-Y coordinates of the mark center define the work-surface position of mark 44 in X-Y coordinates of work surface or sheet-receiving surface 16. Two other registration marks 44 are located, and their centers are defined by X-Y coordinates in like manner.

These data are inputted to controller 50, and controller 50 compares the actual work-surface positions of registration marks 44 on ready-to-be-cut sheet 40 to the positions of the registration marks in the predetermined cutting instructions provided to controller 50. The predetermined cutting path, which is a collection of X-Y coordinates, is adjusted according to the actual X-Y coordinates of registration marks 44. These comparisons are made interactively throughout the cutting process, making the process a dynamic process.

The cutting path is adjusted according to the actual coordinates of the three registration marks 44 closest to a cutting point. When the cutting of an individual graphics area is completed, cutting tool 20 is lifted and moved to the next graphics area and the process is repeated.

Duration operation, sheet 40 is placed on work surface 16 and may be held in place by a vacuum 60 which acts through work surface 16. The cutting of graphics areas 42*a*-42*d* is effected by movement of computer-controlled cutting tool 20 and computer-controlled transverse rail 18. The predetermined cutting instructions contained in controller 50 are based upon graphics areas 42*a*-42*d* which were originally printed on sheet 40. The cutting path is defined in X-Y coordinates.

Figure 3:
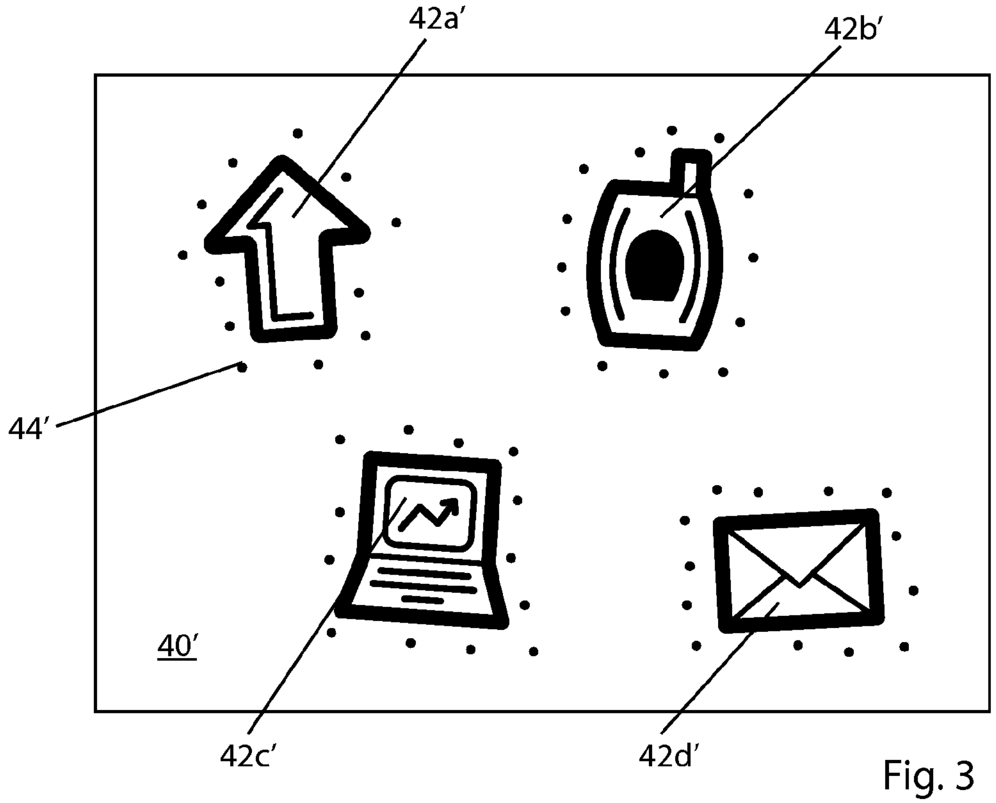
FIG. 3 is a top view of the sheet of material of FIG. 2, in this case the sheet shown having non-uniform distortion across the sheet.

FIG. 3 is a top view of sheet 40 of FIG. 2, in this case sheet 40 shown having non-uniform distortion across sheet 40, in FIG. 3 referred to as sheet 40'. Distortion which original, as-printed sheets 40 may undergo prior to cutting may be of several forms. For example, sheet 40 may be uniformly distorted by undergoing uniform stretching or shrinkage. Sheet 40' in FIG. 3, however, is shown with non-uniform distortion such that graphics area 42*a* is shown rotated slightly counterclockwise (as graphics area 42*a*' on sheet 40') while graphics area 42*b*' on sheet 40' is rotated clockwise from the relative position of graphics area 42*b* on sheet 40. Similarly, graphics areas 42*c*' and 42*d*' are distorted on sheet 40' from their relative positions on sheet 40. Thus, sheet 40' is shown as being non-uniformly distorted across its surface relative to the original as-printed layout on sheet 40 in FIG. 2. Sheet 40' includes registration marks 44' which are in "distorted" positions relative to their relative positions on the original, as-printed sheet 40.

FIGS. 2 and 3 therefore illustrate a cut-processing task which requires apparatus 10 to read (sense) registration marks 44' in various locations across sheet 40' in order to appropriately compensate for the non-uniform distortions on sheet 40' during the processing of graphics areas 42*a'*-42*d'*. The reading of three marks near three of the corners of sheet 40' is inadequate to determine the distortion across non-uniformly-distorted sheet 40'.

Figure 4A:
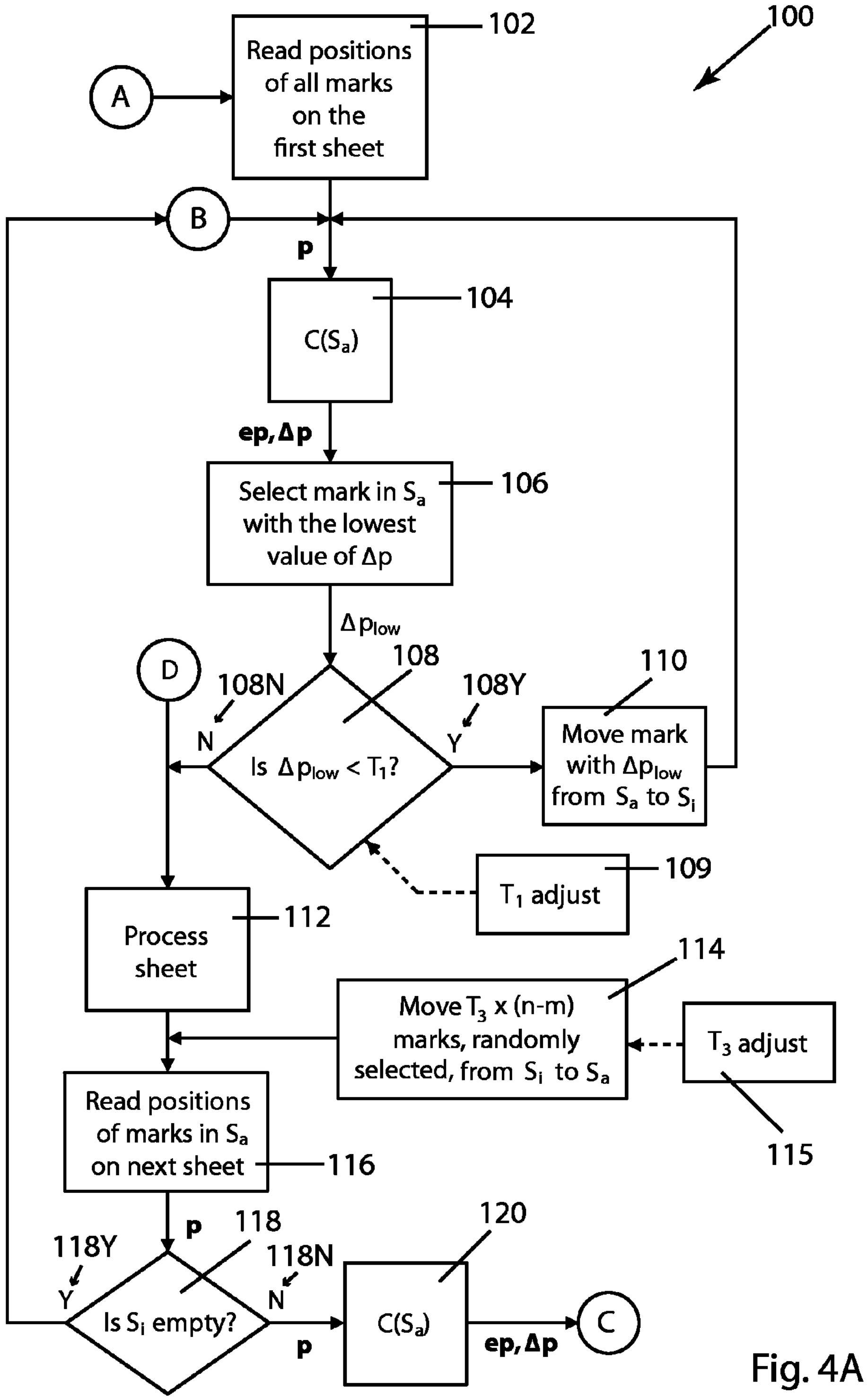
FIGS. 4A and 4B are together a flowchart schematically representing the logic of an embodiment of the inventive method.
Figure 4B:
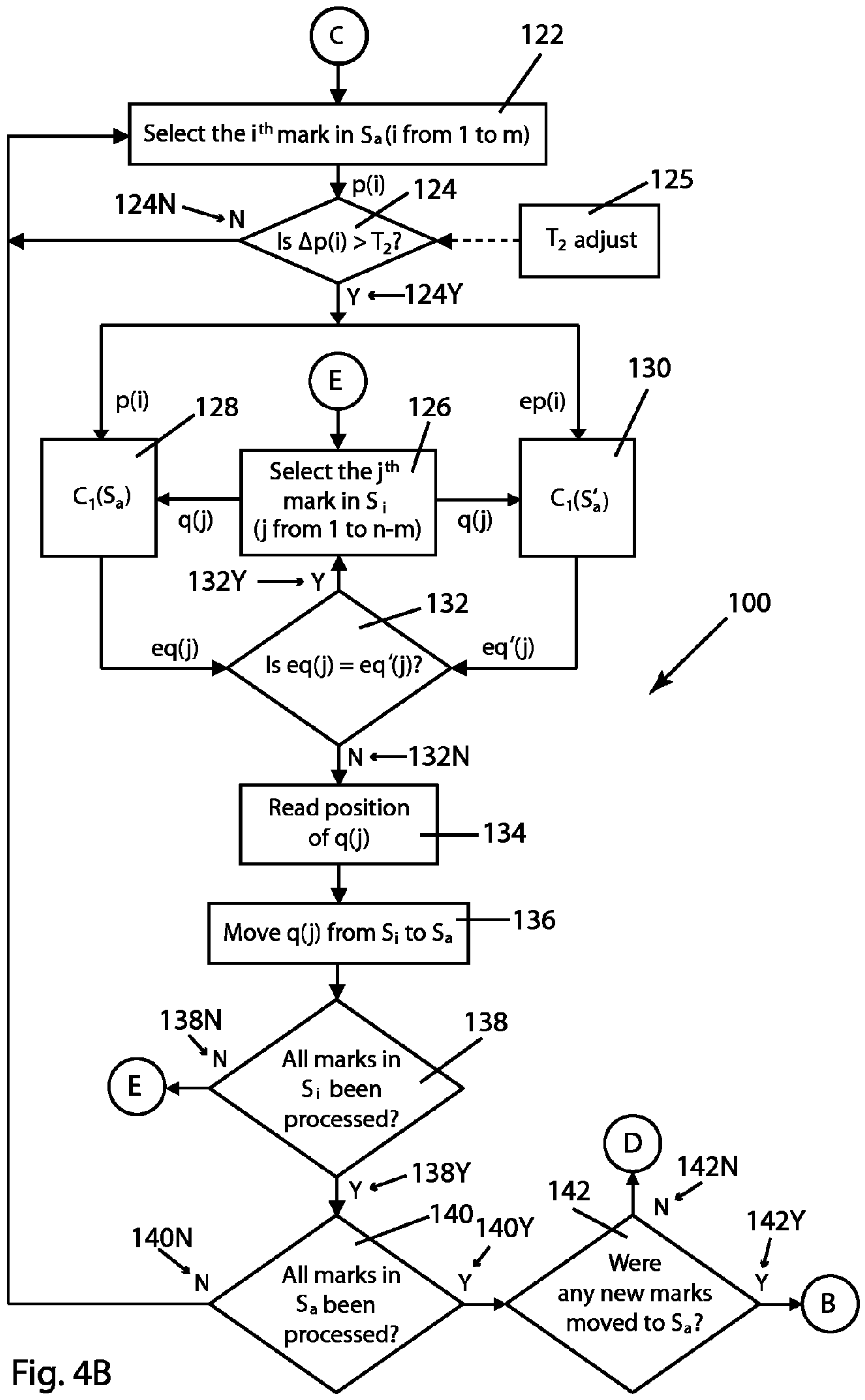

FIGS. 4A and 4B are together a flowchart schematically representing the logic of one embodiment of the inventive method. The logic of this embodiment is shown as process 100. The logic is programmed in a computer which is part of controller 50 controlling cutting apparatus 10. In the mathematical notation of the schematic of FIGS. 4A and 4B, bold letters are used to refer to multiple marks. For example, p refers to the positions of multiple marks p(1), p(2), p(3), etc. where each p(i) is a position of a mark (center of a registration mark 44) represented by X and Y coordinates. Note therefore that p is not a vector but a set of two-dimensional vectors p(I). Note also that a set of marks and the positions of such marks is sometimes herein referred to with the same notation, but in all cases, such reference is unambiguous.

Rectangular boxes generally indicate a functional element or functional block (these two terms are used herein interchangeably) which operates within cutting process 100, and generally, such functional elements operate on an input such as the position of one mark or a set of marks and produce output quantities as indicated. Diamond-shape boxes represent functional decision elements within the flow of process 100, each having possible results "Yes" and "No." The decisions of a decision element having a reference number ddd are indicated by reference number dddY and dddN, for Yes and No decisions, respectively. Small circles containing uppercase letters indicate points within process 100 which connect with like circles (letters are the same). Thus, point C at the top of FIG. 4B continues from the schematic flowchart at point C at the bottom of FIG. 4A.

The embodiment of process 100 of the inventive method begins in FIG. 4A. A multiplicity of sheets 40 are being processed sequentially, the start indicated by point A. In element 102, positions of all registration marks 44 on the first sheet 40 are sensed or read, creating a set p containing n marks and representing the actual positions of registration marks 44. (Sheet 40 is assumed to have n pre-printed registration marks 44 at and about graphics areas 42*a*-42*d*.) The set p represents information which is an input to element 104 which schematically represents a function that operates on the set of marks p and outputs both work-surface positions ep and distances Δp, both defined further below. Such function 104 is represented by the notation $C(S_a)$ where $S_a$ represents all of the marks in an "active" set of marks. The marks in the active set $S_a$ are the marks having the actual work-surface positions p. In general, $S_a$ is said to contain m active marks. At this early stage in process 100, $S_a$ contains all n marks on sheet 40; thus, at this early stage, m=n.

In process 100, marks 44 are classified as either active or inactive. Active marks correspond to registration marks 44 which are read by apparatus 10 in order to process one sheet 40, and inactive marks correspond to registration marks 44 which are ignored (skipped; not read) by apparatus 10 as it processes one sheet 40. Notationally, the inactive set is referred to as $S_i$, and $S_i$ contains n-m inactive marks where m is the number of active marks in $S_a$.

Returning to the function $C(S_a)$ of element 104, $C(S_a)$ creates two sets ep and Δp. ep represents the expected work-surface positions of the marks in $S_a$ where each expected work-surface position ep(i) is determined based on all of the actual work-surface positions p except p(i). Δp represents a set of scalar distances between p(i) and ep(i) such that $\Delta p(i) = |p(i) - ep(I)|$.

At several stages in process 100, such as in functional element 104, an operation is carried out which includes determination of the expected work-surface position of a mark g based on the actual positions of a set of other marks F. An algorithm for this determination of expected work-surface position is presented here, using general notation for both marks and a set of marks as follows: For each mark f in F, two positions $f_{org}$ and $f_{cur}$ are known. $f_{org}(i)$ is the original position of the $i^{th}$ mark in the data which describes the positions of the pre-printed marks on sheet 40. This data is called the job file. An arbitrary origin for the coordinate system of this data can be chosen, such as 0,0 for the X,Y values of the origin of the job file. $f_{cur}(i)$ is the actual sensed work-surface position of the $i^{th}$ mark in F. Using this notation, one possible way to make this determination of expected work-surface mark position includes the following steps:

(1) For each mark f(i) in F, calculate the distance (a scalar value) between $f_{org}(i)$ and the mark g.

(2) Order the marks in F according to this distance. The mark in F with the shortest distance to mark g is designated f(0); the next shortest, f(1), and the next, f(2). f(1) and f(2) should not be closer to $f_{org}(0)$ than a threshold distance $T_4$. $T_4$ may be on the order of 2.5 centimeters. Also, f(1) and f(2) should not make the angle between the two vectors $\{f_{org}(0),f_{org}(1)\}$ and $\{f_{org}(0), f_{org}(2)\}$ less than a threshold angle $T_5$; if so, these marks should not be selected. $T_5$ may be on the order of 60 degrees. If a mark f(i) does not satisfy these two criteria, if possible, another mark with the next shortest distance to mark g (and/or which satisfies the angle criterion $T_5$) is selected.

(3) Define the coordinate system spanned by and defined by $\{f_{org}(0),f_{org}(1)\}$ and $\{f_{org}(0), f_{org}(2)\}$ and having $f_{org}(0)$ as its origin as coordinate system $\Gamma_{org}$.

(4) Define the coordinate system spanned by and defined by $\{f_{cur}(0),f_{cur}(1)\}$ and $\{f_{cur}(0), f_{cur}(2)\}$ and having $f_{cur}(0)$ as its origin as coordinate system $\Gamma_{cur}$.

(5) Define the coordinate transformation between coordinate systems $\Gamma_{org}$ and $\Gamma_{cur}$ and transformation $\phi$. Transformations between coordinate systems are well-known to those skilled in the art of graphics programming and mathematics.

(6) Determine the expected work-surface position of mark g by applying the transformation $\phi$ to the original position $g_{org}$ of mark g.

Referring again to FIG. 4A, in functional element 106, the mark in the active set of marks $S_a$ (at this stage, all n pre-printed marks) with the smallest value of Δp, called $\Delta p_{low}$, is selected. In decision block 108, $\Delta p_{low}$, selected in block 106, is compared to a first error criterion threshold distance $T_1$, and if $\Delta p_{low}$ is smaller than $T_1$ (decision result 108Y), the corresponding registration mark is classified as inactive (moved into the inactive set of marks S,) and process 100 returns to functional block 104 and repeats this analysis of active marks (now a reduced set of marks $S_a$) until all marks satisfying the threshold $T_1$ criterion of decision block 108 have been classified as inactive marks and moved into the set $S_i$.

Process 100 then continues by processing (cutting the graphics area from) the first sheet 40 in functional block 112 and then reading the work-surface positions of active marks 44 on the next sheet 40 to be processed in functional block 116. At this point, in decision element 118, if there are no inactive marks (decision result 118Y), process 100 returns to functional element 104 to begin classifying marks based on the measurements made in functional element 116. Note that if all marks remain active as a multiplicity of sheets 40 are processed, process 100 continues as described above to process sheets 40. If there are inactive marks ($S_i$ is not empty;

decision result 118N), process 100 proceeds to functional block 120 to calculate ep and Δp for the reduced set of active marks $S_a$.

Process 100 then continues with operations which determine whether an inactive mark should remain as inactive. In functional block 122, a mark p(i) is selected from the active set $S_a$, and its corresponding value Δp(i) is compared with a second error criterion threshold $T_2$ in decision element 124. If Δp(i) is not greater than threshold $T_2$ (decision result 124N), then process 100 continues by returning to select another mark in the active set $S_a$ in block 122. If Δp(i) is greater than threshold $T_2$ (decision result 124Y), then process 100 proceeds to determine if any inactive marks are influenced by the active mark p(i) and reclassifying any such influenced marks as active marks.

Functional elements 128 and 130 carry out operations similar to the function of block 104, with the following differences: Instead of determining an expected work-surface position for one mark in $S_a$ based on the positions of all of the other marks in $S_a$, (a) $C_1(S_a)$ in functional block 128 determines the expected position eq(j) of an inactive mark q(j) in $S_i$ based on the positions of all of the active marks in $S_a$ and (b) $C_1(S'_a)$ in functional block 130 determines the expected position eq'(j) of an inactive mark q(j) in $S_i$ based on the positions of all of the active marks in $S'_a$ where, as indicated by the input to functional element 130, the work-surface position of active mark p(i) is replaced by the expected work-surface position ep(i) as determined in functional element 120. Note that the operations occurring in functional elements 128 and 130 do not proceed until both inputs to the functional blocks are provided; the operation of functional block 126 selects the $j^{th}$ registration mark in inactive set $S_i$.

Expected positions eq(j) and eq'(j) are compared in decision block 132. If these two expected work-surface positions are equal (decision result 132Y), then it has been determined that inactive mark q(j) is not influenced by active mark p(i) which has violated the second error criterion in functional decision block 124 and process 100 continues by selecting another inactive mark q(j) in functional block 126 and proceeding with determining whether or not its expected work-surface position eq(j) is influenced by active mark p(I).

If in decision block 132 it is determined that inactive mark q(j) is influenced by active mark p(i) (decision result 132N), then the actual position of inactive mark q(j) is sensed by sensor 22 in functional block 134 and inactive mark q(j) becomes an active mark and is moved from set $S_i$ to set $S_a$ in functional block 136.

Functional decision blocks 138 and 140 carry out similar loop control functions, directing the flow of process 100 such that all marks in inactive set $S_i$ are examined with respect to a specific active mark p(i) (decision block 138) and such that all marks in active set $S_a$ are examined with respect to the second error criterion (decision element 140). If in either decision block 138 or 140, these two tasks are not complete, process 100 returns to point E (decision 138N) or functional block 122 to make another mark selection as appropriate and continue through the determinations as described above.

When these two loop control functions are both satisfied as indicated by decision 140Y in decision block 140, then decision element 142 determines at which point in process 100 to continue the processing of multiple sheets 40. If it is determined that no marks were moved from $S_i$ to $S_a$ during the previous operations (decision result 142N), then process 100 continues operation at point D (see FIG. 4A) by processing the current sheet (cutting graphics areas) in functional block 112. If, however, it is determined in decision element 142 that one or more inactive marks were reclassified as active marks (moved from $S_i$ to $S_a$), then process 100 proceeds to determine if any marks in the now-updated active set $S_a$ should be reclassified as inactive based on the new updated active set $S_a$ by continuing at point B (see FIG. 4A).

Process 100, one embodiment of the inventive method, proceeds as described via apparatus 10 to rapidly and accurately cut (or otherwise narrow-path-process) a multiplicity of sheets 40. Functional element 114 in FIG. 4A represents an additional means by which inactive marks are "monitored" to ensure that distortion of sheets 40 in a stack of multiple sheets is compensated for during such processing. In this embodiment, one or more inactive marks are selected randomly from set $S_i$ and moved to active set $S_a$. A parameter $T_3$ is the percentage of inactive marks in $S_i$ which are randomly selected. This additional means of monitoring distortion catches previously-isolated inactive marks that may become important as the distortion within the stack of multiple sheets 40 changes through the stack.

The time saved in processing, while still ensuring accurate cutting performance, may be significant. Using a number of simplifying assumptions, the amount of time saved during processing may be estimated. Assume that (a) one thousand (1,000) substantially-identical sheets 40 (such as FIG. 2) are processed; (b) each sheet 40 has fifty (50) pre-printed registration marks 44 at and about graphics areas 42*a*-42*d*; (c) sensing or reading of a registration mark 44 may typically take about 0.3 of a second; and (d) on average, 70% of the marks are active during the processing of each sheet 40. With these simplifying assumptions, it is easily seen that just under three (3) hours of processing time is saved. Whatever the total processing time for the complete job is (not estimated here), this amount of time on such a cutting job represents a significant productivity increase for a user.

It should also be noted that this invention enables a user to liberally print a large number of registration marks at and about graphics areas on a sheet without the time-penalty of processing extra marks since the inventive system reduces this time according to the current distortion. Further, the liberal application of registration marks ensures that all regions of distortion are found and compensated for without having to predict where the best mark locations should be.

Figure 5:
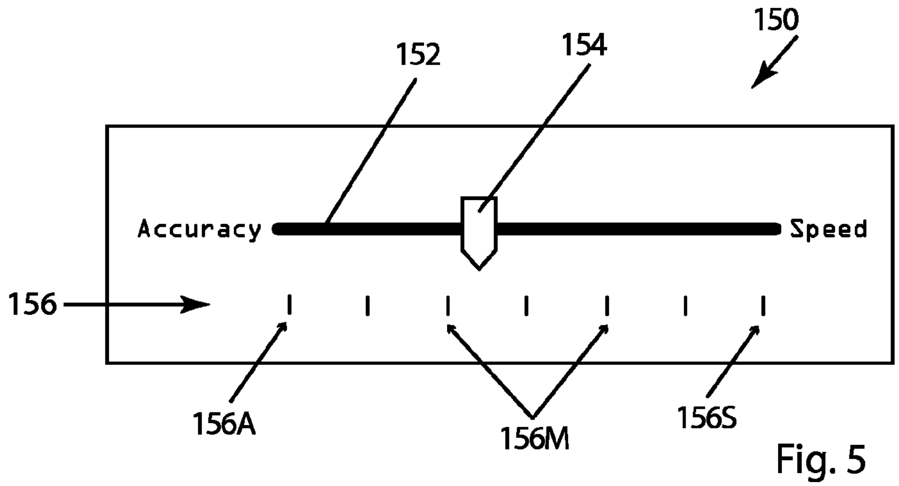
FIG. 5 is a schematic representation of an input control on a computer display or the like which enables a user to adjust three parameters which are elements in a programmed controller controlling the inventive method of the embodiment of FIGS. 4A and 4B.

Functional elements 109, 115 and 125 each represent that thresholds $T_1$ and $T_2$ and percentage $T_3$ may be adjusted to select the desired speed and accuracy of the processing of multiple sheets on which graphics areas are being processed. Such adjustment may be made to the individual values of $T_1$, $T_2$ and $T_3$ or simultaneously adjusted as illustrated in FIGS. 5 and 6A-6C. FIG. 5 is a schematic representation of an input control 150 on a computer display (not shown separately) or the like which enables a user to adjust these three parameters ($T_1$, $T_2$ and $T_3$) simultaneously as parameters in programmed controller 50 controlling process 100 in apparatus 10.

Control 150 includes a slider bar 152 with an indicator 154 and a position scale 156 with seven individual scale marks 156M. Two of these scale marks 156M are end marks 156A and 156S indicating positions of processing maximum accuracy (156A) and processing maximum speed (156S). Values of parameters $T_1$, $T_2$ and $T_3$ are set simultaneously by the user positioning indicator 154 along slider bar 152 at one of the seven preset positions corresponding to marks 156M.

Figure 6A:
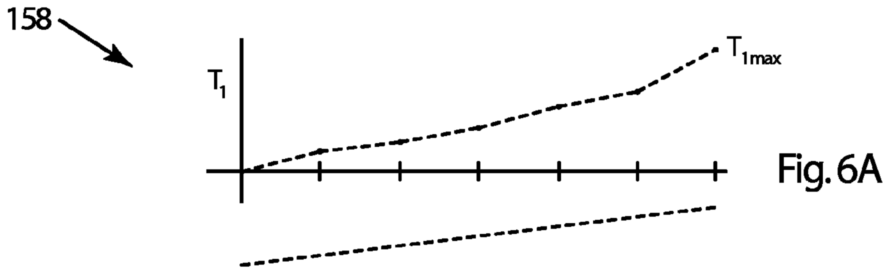
FIGS. 6A, 6B, and 6C are graphical representations of one embodiment of how the three user-adjustable parameters may be varied as the control of FIG. 5 is adjusted.
Figure 6B:
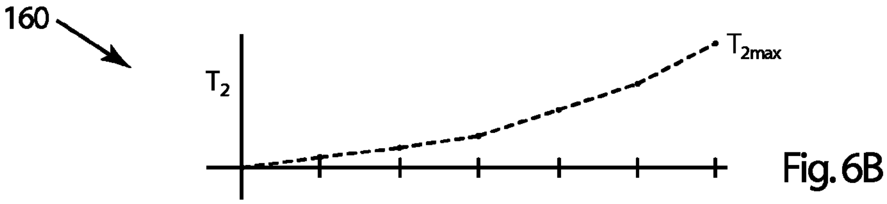
Figure 6C:
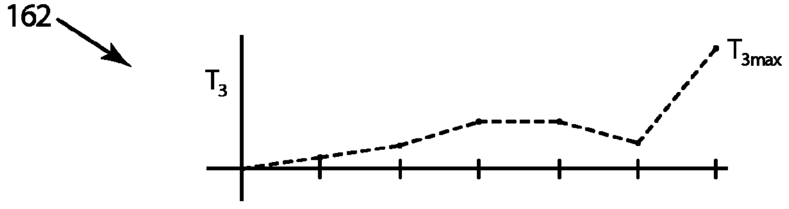

FIGS. 6A, 6B, and 6C are graphical representations of one embodiment of how the three user-adjustable parameters vary as input control 150 of FIG. 5 is adjusted. In this embodiment, each of the three parameters is varied according the position of indicator 154, varying between 0 and a maximum value for each parameter, $T_{1max}$, $T_{2max}$, and $T_{3max}$, respectively, and as shown by graphs 158, 160 and 162, respectively. For indicator positions at marks 156A ($T_1$=0), the values of $T_2$ and $T_3$ are meaningless since with $T_1$=0, no registration marks are ever classified as inactive by process 100.

$T_1$ is a first threshold distance (first error criterion) which represents a distance below which a user is satisfied that the difference between the actual and expected work-surface positions of a mark indicate that is acceptable to ignore the sensing of the position of such mark until it is later determined that the distortion of sheet 40 has created the need to again sense the position of such mark. $T_2$ is a second threshold distance (second error criterion) the value of which is selected to identify regions of larger distortion on sheet 40. Values for $T_{1_{max}}$ may usefully be on the order of 225 microns. Values for $T_{2_{max}}$ may usefully be on the order of 2,250 microns.

The function of the parameter T3 has been described above. Values for $T_{3_{max}}$ may usefully be on the order of 25%.

It should be noted that although the registration marks and the graphics areas to be processed are normally printed on and processed from a single side of a sheet, systems (and methods they perform) which sense and process from an underside or from both sides with using marks (and/or through-holes which serve as marks) and graphics prepared accordingly are within the scope of this invention.

While the principles of the invention have been shown and described in connection with specific embodiments, it is to be understood that such embodiments are by way of example and are not limiting.

The invention claimed is:

1. In a method for cutting graphics areas from a multiplicity of substantially-identical sheets having registration marks at predetermined positions at and about the graphics areas, including (a) providing a plotter for sequentially receiving the sheets, (b) providing a sensor operatively connected to the plotter for moving over a work surface and configured to sense work-surface positions of registration marks of the sheets, (c) providing a cutter operatively connected with respect to the sensor and movable to cut the graphics areas from a sheet in response to sensed registration-mark positions with respect to the work surface, and (d) providing a programmed controller operatively connecting the cutter to the sensor to control cutter movement, the improvement comprising:

- sensing the work-surface positions of the registration marks of a sheet and calculating an expected work-surface position for each registration mark based on the work-surface positions of at least some of the other registration marks;
- classifying each registration mark as active or inactive based on a first error criterion and applying the classification to corresponding marks of a subsequent sheet, the active marks being fewer than the total number of registration marks;
- sensing the work-surface positions of the active registration marks of the subsequent sheet; and
- cutting the graphics area(s) from the subsequent sheet based on the sensed positions of the active marks, thereby reducing the time for accurate cut-processing of the subsequent sheet.

2. The cutting method of claim 1 further including the steps of: calculating an expected work-surface position for an active registration mark of the subsequent sheet based on the work-surface positions of at least some of the active registration marks of the subsequent sheet; determining whether an active registration mark violates a second error criterion; and if a mark violates the second error criterion, determining whether the expected work-surface positions of any inactive registration marks are influenced by the violating mark and reclassifying the influenced inactive marks as active marks for a further subsequent sheet.

3. The cutting method of claim 2 further including repetitive steps of determining which registration marks are active for sheets and thereby accurately cut-processing the multiplicity of sheets.

4. The cutting method of claim 1 wherein the first error criterion is a first threshold distance and the classifying includes: computing the distance between the expected and sensed work-surface positions of an active registration mark; and comparing the computed distance for such mark with the first threshold distance, such mark thereupon being classified as inactive if its computed distance is less than the first threshold distance.

5. The cutting method of claim 4 further including the step of adjusting the first error criterion threshold distance to select a desired accuracy and speed of cutting.

6. The cutting method of claim 4 wherein the second error criterion is a second threshold distance.

7. The cutting method of claim 6 further including the step of adjusting the second error criterion threshold distance to select a desired accuracy and speed of cutting.

8. The cutting method of claim 7 further including the step of randomly selecting one or more inactive registration marks and classifying them as active marks and wherein (a) the number of randomly-selected points is a user-adjustable percentage of the inactive points and (b) the first threshold distance, the second threshold distance, and the user-adjustable percentage are simultaneously adjusted with a single user-setting.

9. The cutting method of claim 1 further including the step of randomly selecting one or more inactive registration marks and classifying them as active marks.

10. The cutting method of claim 9 wherein the number of randomly-selected marks is a user-adjustable percentage of the inactive points.

11. In a method for narrow-path processing graphics areas on a multiplicity of substantially-identical sheets having registration marks at predetermined positions at and about the graphics areas, including (a) providing a plotter for sequentially receiving the sheets, (b) providing a sensor operatively connected to the plotter for moving over a work surface and configured to sense work-surface positions of registration marks of the sheets, (c) providing a narrow-path processing tool operatively connected to the sensor and movable to narrow-path-process the graphics areas on a sheet in response to sensed registration-mark positions with respect to the work surface, and (d) providing a programmed controller operatively connecting the tool to the sensor to control tool movement, the improvement comprising: sensing the work-surface positions of the registration marks of a sheet and calculating an expected work-surface position for each registration mark based on the work-surface positions of at least some of the other registration marks; classifying each registration mark as active or inactive based on a first error criterion and applying the classification to corresponding marks of a subsequent sheet, the active marks being fewer than the total number of registration marks; sensing the work-surface positions of the active registration marks of the subsequent sheet; and narrow-path-processing the graphics area(s) on the subsequent sheet based on the sensed positions of the active marks, thereby reducing the time for accurate narrow-path-processing of the subsequent sheet.

12. The narrow-path-processing method of claim 11 further including the steps of: calculating an expected work-surface position for an active registration mark of the subsequent sheet based on the work-surface positions of at least some of the active registration marks of the subsequent sheet; determining whether an active registration mark violates a second error criterion; and if a mark violates the second error criterion, determining whether the expected work-surface positions of any inactive registration marks are influenced by the violating mark and reclassifying the influenced inactive marks as active marks for a further subsequent sheet.

13. The narrow-path-processing method of claim 12 further including repetitive steps of determining which registration marks are active for sheets and thereby accurately cut-processing the multiplicity of sheets.

14. The narrow-path-processing method of claim 11 wherein the first error criterion is a first threshold distance and the classifying includes: computing the distance between the expected and sensed work-surface positions of an active registration mark; and comparing the computed distance for such mark with the first threshold distance, such mark thereupon being classified as inactive if its computed distance is less than the first threshold distance.

15. The cutting method of claim 14 further including the step of randomly selecting one or more inactive registration marks and classifying them as active marks and wherein (a) the number of randomly-selected points is a user-adjustable percentage of the inactive points, (b) the second error criterion is a second threshold distance, and (c) the first threshold distance, the second threshold distance, and the user-adjustable percentage are simultaneously adjusted with a single user-setting.

16. In apparatus for cutting graphics areas from a multiplicity of substantially-identical sheets having registration marks at predetermined positions at and about the graphics areas, including (a) a plotter for sequentially receiving the sheets, (b) a sensor operatively connected to the plotter for moving over a work surface and configured to sense work-surface positions of registration marks of the sheets, (c) a cutter operatively connected to the sensor and movable to cut the graphics areas from a sheet in response to sensed registration-mark positions, and (d) a programmed controller operatively connecting the cutter to the sensor to control cutter movement, the apparatus adapted to: sense the work-surface positions of the registration marks of a sheet and calculate an expected work-surface position for each of registration mark based on the work-surface positions of at least some of the other registration marks; classify each registration mark as active or inactive based on a first error criterion and apply the classification to corresponding marks of a subsequent sheet, the active marks being fewer than the total number of registration marks; sense the work-surface positions of the active registration marks of the subsequent sheet; and cut the graphics area(s) from the subsequent sheet based on the sensed positions of the active marks, thereby reducing the time for accurate cut-processing of the subsequent sheet.

17. The cutting apparatus of claim 16 further adapted to: calculate an expected work-surface position for an active registration mark of the subsequent sheet based on the work-surface positions of at least some of the active registration marks of the subsequent sheet; determine whether an active registration mark violates a second error criterion; and if a mark violates the second error criterion, determine whether the expected work-surface positions of any inactive registration marks are influenced by the violating mark and reclassify the influenced inactive marks as active marks for a further subsequent sheet.

18. The cutting apparatus of claim 17 further adapted to repetitively determine which registration marks are active for sheets and thereby accurately cut-process the multiplicity of sheets.

19. The cutting apparatus of claim 16 wherein the first error criterion is a first threshold distance and the classifying includes: computing the distance between the expected and sensed work-surface positions of an active registration mark; and comparing the computed distance for such mark with the first threshold distance, such mark thereupon being classified as inactive if its computed distance is less than the first threshold distance.

20. The cutting apparatus of claim 19 further adapted to randomly select one or more inactive registration marks and classify them as active marks and wherein (a) the number of randomly-selected points is a user-adjustable percentage of the inactive points, (b) the second error criterion is a second threshold distance, and (c) the apparatus is further adapted to enable a user to adjust the first threshold distance, the second threshold distance, and the user-adjustable percentage simultaneously with a single user-setting.

* * * * *